US012203420B2

(12) United States Patent
Ochi

(10) Patent No.: US 12,203,420 B2
(45) Date of Patent: Jan. 21, 2025

(54) INTERNAL COMBUSTION ENGINE CONTROL DEVICE AND INTERNAL COMBUSTION ENGINE CONTROL METHOD

(71) Applicant: TOYOTA JIDOSHA KABUSHIKI KAISHA, Toyota (JP)

(72) Inventor: Yuta Ochi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/346,578

(22) Filed: Jul. 3, 2023

(65) Prior Publication Data
US 2024/0093651 A1    Mar. 21, 2024

(30) Foreign Application Priority Data
Sep. 21, 2022   (JP) ................. 2022-150340

(51) Int. Cl.
*F02N 11/08* (2006.01)
*F02D 13/02* (2006.01)
*F02D 15/00* (2006.01)

(52) U.S. Cl.
CPC ......... *F02D 13/0226* (2013.01); *F02D 15/00* (2013.01); *F02N 11/0862* (2013.01);
(Continued)

(58) Field of Classification Search
CPC ............. F02D 13/0223; F02D 13/0226; F02D 13/023; F02D 13/0234; F02D 13/0238;
(Continued)

(56) References Cited

U.S. PATENT DOCUMENTS 5,924,395 A * 7/1999 Moriya ................ B60K 6/46
   903/905
7,481,199 B2 * 1/2009 Nakamura .......... F01L 13/0026
   123/48 R (Continued)

FOREIGN PATENT DOCUMENTS

JP    2006-299812 A    11/2006

*Primary Examiner* — Erick R Solis
(74) *Attorney, Agent, or Firm* — Oblon, McClelland, Maier & Neustadt, L.L.P.

(57) ABSTRACT

An internal combustion engine control device includes: a temperature acquisition unit configured to acquire the temperature of an internal combustion engine at the time when it is requested to start the internal combustion engine; a motoring execution unit configured to execute motoring of the internal combustion engine using the motor when it is requested to start the internal combustion engine; and an in-cylinder pressure control unit configured to control the in-cylinder pressure of the internal combustion engine during the motoring based on the temperature of the internal combustion engine. The in-cylinder pressure control unit is configured to execute in-cylinder pressure increase control, in which the in-cylinder pressure is increased when the temperature of the internal combustion engine is equal to or less than a predetermined threshold temperature compared to when the temperature of the internal combustion engine is higher than the threshold temperature, since the motoring is started.

11 Claims, 11 Drawing Sheets

(52) U.S. Cl.
CPC .... *F02D 2200/021* (2013.01); *F02D 2200/50* (2013.01); *F02D 2200/503* (2013.01)

(58) Field of Classification Search
CPC .......... F02D 15/00; F02D 15/02; F02D 15/04; F02D 2200/021; F02D 2200/503; F02N 11/0862
USPC ......... 123/78 R, 78 A, 78 AA, 78 B, 78 BA, 123/78 C, 78 D, 78 E, 78 F, 90.15–90.18, 123/179.21, 182.1
See application file for complete search history.

(56) References Cited

U.S. PATENT DOCUMENTS

| | | | |
|---|---|---|---|
| 8,095,298 B2 * | 1/2012 | Nakamura | F01L 13/0026 701/112 |
| 8,316,809 B1 * | 11/2012 | Patterson | F01L 13/0015 123/90.55 |
| 2008/0255752 A1 * | 10/2008 | Sugihara | F02D 21/08 123/90.15 |
| 2011/0271920 A1 * | 11/2011 | Akihisa | F02D 41/047 123/90.15 |

* cited by examiner

INTERNAL COMBUSTION ENGINE CONTROL DEVICE AND INTERNAL COMBUSTION ENGINE CONTROL METHOD

CROSS-REFERENCE TO RELATED APPLICATION

This application claims priority to Japanese Patent Application No. 2022-150340 filed on Sep. 21, 2022 incorporated herein by reference in its entirety.

BACKGROUND

1. Technical Field

The present disclosure relates to an internal combustion engine control device and an internal combustion engine control method.

2. Description of Related Art

When an internal combustion engine mounted on a vehicle is started, combustion of an air-fuel mixture is started after the engine rotational speed is raised to a predetermined starting rotational speed through motoring by a motor.

In a vehicle described in Japanese Unexamined Patent Application Publication No. 2006-299812 (JP 2006-299812 A), the valve closing timing of an intake valve is advanced by the time when the engine rotational speed reaches the starting rotational speed so as to increase combustion energy at the time of initial explosion when the internal combustion engine is started at low temperatures. When the engine rotational speed during motoring is low, on the other hand, the valve closing timing of the intake valve is kept retarded with an intention to promote a rise in the engine rotational speed by lowering the in-cylinder pressure.

SUMMARY

According to the findings of the inventor of the present application, however, friction torque is increased and a mechanical loss due to friction is increased when the in-cylinder pressure during motoring is lowered when the internal combustion engine is started at low temperatures, in consideration of the lubrication state of a sliding portion of the internal combustion engine at low temperatures. Thus, there is room for improvement in motoring control performed when the internal combustion engine is started at low temperatures.

Thus, the present disclosure proposes an internal combustion engine control device and an internal combustion engine control method that reduce motor torque that is necessary for motoring for starting an internal combustion engine without degrading the startability of the internal combustion engine when the internal combustion engine is started at low temperatures.

A first aspect of the present disclosure relates to an internal combustion engine control device that controls an internal combustion engine mounted on a vehicle that includes a motor and a battery. The internal combustion engine control device includes a temperature acquisition unit, a motoring execution unit, and an in-cylinder pressure control unit. The temperature acquisition unit is configured to acquire a temperature of the internal combustion engine at a time when it is requested to start the internal combustion engine. The motoring execution unit is configured to execute motoring of the internal combustion engine using the motor when it is requested to start the internal combustion engine. The in-cylinder pressure control unit is configured to control an in-cylinder pressure of the internal combustion engine during the motoring based on the temperature of the internal combustion engine. The in-cylinder pressure control unit is configured to execute in-cylinder pressure increase control, in which the in-cylinder pressure is increased when the temperature of the internal combustion engine is equal to or less than a predetermined threshold temperature compared to when the temperature of the internal combustion engine is higher than the threshold temperature, since the motoring is started.

In the internal combustion engine control device according to the first aspect of the present disclosure, the in-cylinder pressure control unit may be configured to increase the in-cylinder pressure in the in-cylinder pressure increase control to a greater degree as the temperature of the internal combustion engine is lower when the temperature of the internal combustion engine is equal to or less than the threshold temperature.

In the internal combustion engine control device according to the first aspect of the present disclosure, the in-cylinder pressure control unit may be configured to increase the in-cylinder pressure in the in-cylinder pressure increase control to a constant degree, irrespective of the temperature of the internal combustion engine, when the temperature of the internal combustion engine is equal to or less than the threshold temperature.

The internal combustion engine control device according to the first aspect of the present disclosure may further include a state of charge (SOC) calculation unit configured to calculate an SOC of the battery. The in-cylinder pressure control unit may be configured to increase the in-cylinder pressure in the in-cylinder pressure increase control to a greater degree as the SOC is lower when the temperature of the internal combustion engine is equal to or less than the threshold temperature.

In the internal combustion engine control device according to the first aspect of the present disclosure, the in-cylinder pressure control unit may be configured to control the in-cylinder pressure by changing a valve closing timing of an intake valve of the internal combustion engine using a variable valve timing mechanism provided in the internal combustion engine.

In the internal combustion engine control device configured as described above, the variable valve timing mechanism may be an electric variable valve timing mechanism to be driven electrically.

In the internal combustion engine control device configured as described above, the variable valve timing mechanism may be a hydraulic variable valve timing mechanism to be driven hydraulically. The in-cylinder pressure control unit may be configured to advance the valve closing timing when the internal combustion engine is stopped when the temperature of the internal combustion engine is equal to or less than the threshold temperature.

In the internal combustion engine control device configured as described above, the in-cylinder pressure control unit may be configured to advance the valve closing timing at a time when the internal combustion engine is stopped to a greater degree as the temperature of the internal combustion engine is lower when the temperature of the internal combustion engine is equal to or less than the threshold temperature.

In the internal combustion engine control device configured as described above, the in-cylinder pressure control unit may be configured to advance the valve closing timing to a constant degree, irrespective of the temperature of the internal combustion engine, when the temperature of the internal combustion engine is equal to or less than the threshold temperature.

In the internal combustion engine control device according to the first aspect of the present disclosure, the in-cylinder pressure control unit may be configured to control the in-cylinder pressure by changing an amount of lift of an intake valve of the internal combustion engine using a variable valve lift mechanism provided in the internal combustion engine.

In the internal combustion engine control device according to the first aspect of the present disclosure, the in-cylinder pressure control unit may be configured to control the in-cylinder pressure by changing a mechanical compression ratio of the internal combustion engine using a variable compression ratio mechanism provided in the internal combustion engine.

A second aspect of the present disclosure relates to an internal combustion engine control method of controlling an internal combustion engine mounted on a vehicle that includes a motor and a battery. The internal combustion engine control method includes: (i) acquiring a temperature of the internal combustion engine at a time when it is requested to start the internal combustion engine; (ii) executing motoring of the internal combustion engine using the motor when it is requested to start the internal combustion engine; (iii) controlling an in-cylinder pressure of the internal combustion engine during the motoring based on the temperature of the internal combustion engine; and (iv) executing in-cylinder pressure increase control, in which the in-cylinder pressure is increased when the temperature of the internal combustion engine is equal to or less than a predetermined threshold temperature compared to when the temperature of the internal combustion engine is higher than the threshold temperature, since the motoring is started.

With the internal combustion engine control device and the internal combustion engine control method according to the present disclosure, it is possible to reduce motor torque that is necessary for motoring for starting an internal combustion engine without degrading the startability of the internal combustion engine when the internal combustion engine is started at low temperatures.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described in detail below with reference to the drawings. In the following description, like constituent elements are denoted by like reference signs.

First of all, a first embodiment of the present disclosure will be described with reference to FIGS. 1 to 9.

Figure 1:
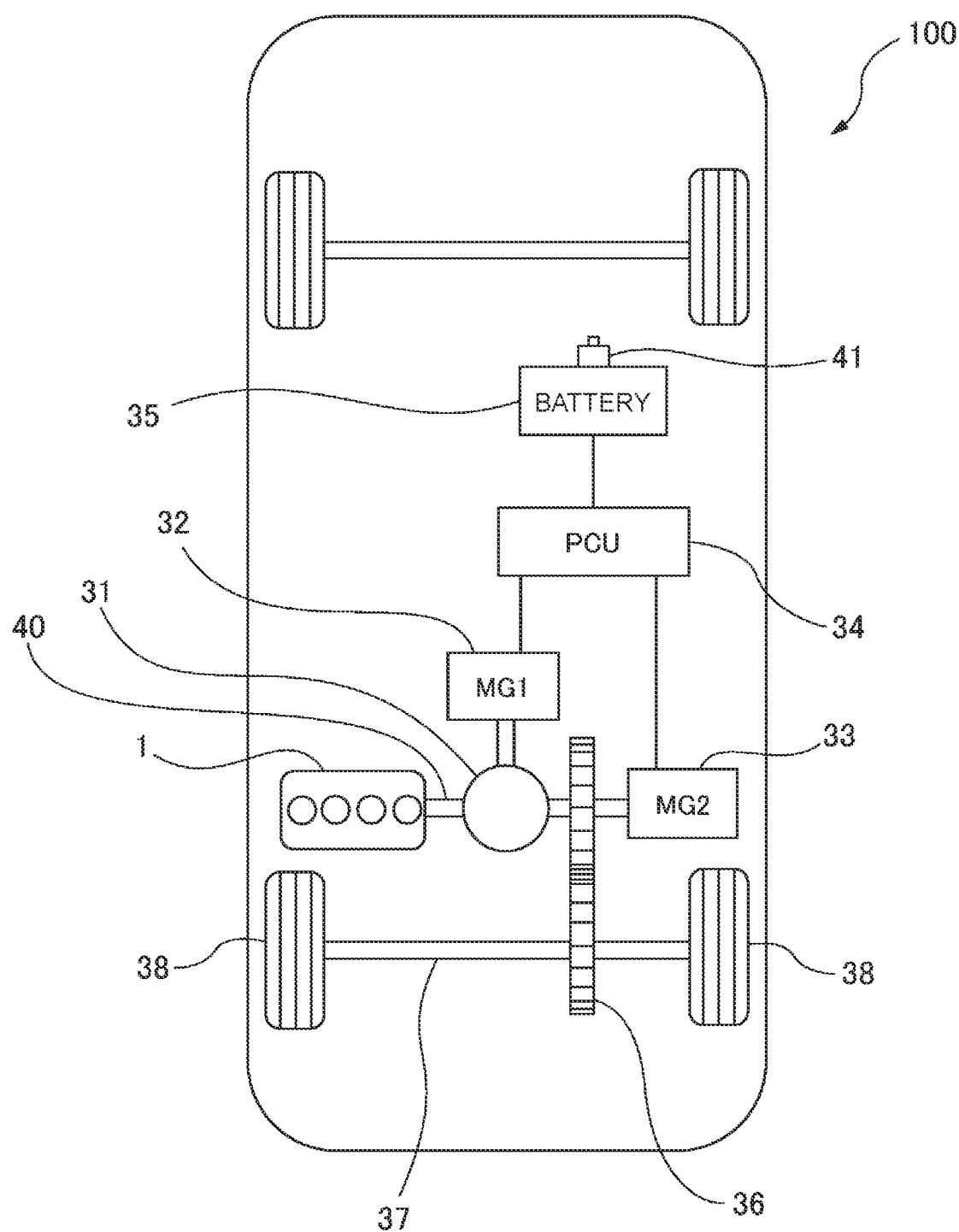
FIG. 1 schematically illustrates a vehicle to which an internal combustion engine control device according to a first embodiment of the present disclosure is applied.

A vehicle as a whole will be first described. FIG. 1 schematically illustrates a vehicle 100 to which an internal combustion engine control device according to a first embodiment of the present disclosure is applied. The vehicle 100 includes an internal combustion engine 1, a power splitting mechanism 31, a first motor generator (MG1) 32, a second motor generator (MG2) 33, a power control unit (PCU) 34, a battery 35, and a speed reducer 36.

The vehicle 100 includes the internal combustion engine 1 and the second motor generator 33 as power sources for travel. That is, the vehicle 100 is a so-called hybrid electric vehicle (HEV). Since the configuration of the hybrid electric vehicle is known, the function of the components will be briefly described below.

An output shaft (crankshaft 40) of the internal combustion engine 1 is mechanically connected to a power splitting mechanism 31, and an output of the internal combustion engine 1 is input to the power splitting mechanism 31. When the first motor generator 32 functions as an electric generator, the output of the internal combustion engine 1 is distributed to the first motor generator 32 and the speed reducer 36 via the power splitting mechanism 31. The first motor generator 32 generates power using the output of the internal combustion engine 1 distributed to the first motor generator 32. On the other hand, the output of the internal combustion engine 1 distributed to the speed reducer 36 is transferred to wheels 38 via axles 37 as power for travel.

The first motor generator 32 is mechanically connected to the crankshaft 40 of the internal combustion engine 1 via the power splitting mechanism 31. When the first motor generator 32 functions as an electric motor, power stored in the battery 35 is supplied to the first motor generator 32 via the PCU 34. An output of the first motor generator 32 is supplied to the crankshaft 40 of the internal combustion engine 1 via the power splitting mechanism 31. As a result, so-called motoring in which the crankshaft 40 is rotationally driven without combustion of an air-fuel mixture in the internal combustion engine 1 is performed.

When the second motor generator 33 functions as an electric motor, power stored in the battery 35 or power generated by the first motor generator 32 is supplied to the second motor generator 33 via the PCU 34, and an output of the second motor generator 33 is supplied to the speed reducer 36. The output of the second motor generator 33 supplied to the speed reducer 36 is transferred to the wheels 38 via the axles 37 as power for travel.

When the vehicle decelerates, on the other hand, the second motor generator 33 functions as an electric generator with the second motor generator 33 driven by rotation of the wheels 38. Regenerated power generated by the second motor generator 33 is supplied to the battery 35 via the PCU 34.

Figure 2:
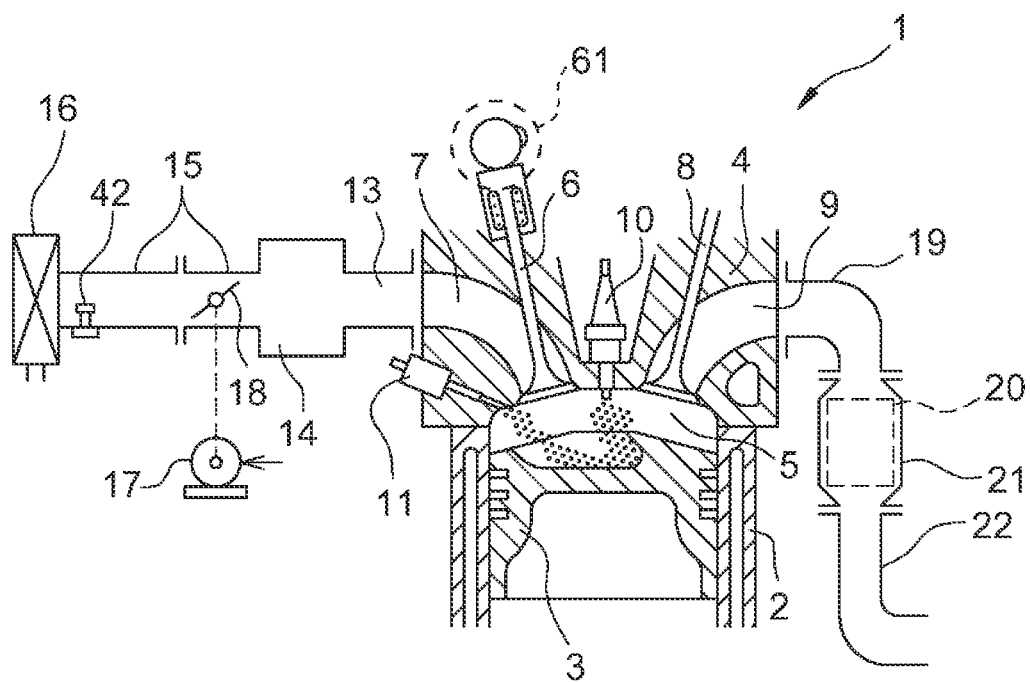
FIG. 2 schematically illustrates the configuration of an internal combustion engine in FIG. 1.

Next, the internal combustion engine will be described. FIG. 2 schematically illustrates the configuration of the internal combustion engine 1 in FIG. 1. The internal combustion engine 1 is a spark-ignition internal combustion engine, specifically a gasoline engine that uses gasoline as fuel.

The internal combustion engine 1 includes an engine body that includes a cylinder block 2 and a cylinder head 4. A plurality of (e.g. four) cylinders is formed inside the cylinder block 2. A piston 3 is disposed in each cylinder to reciprocate in the axial direction of the cylinder. A combustion chamber 5 is formed between the piston 3 and the cylinder head 4.

An intake port 7 and an exhaust port 9 are formed in the cylinder head 4. The intake port 7 and the exhaust port 9 are connected to the combustion chamber 5.

The internal combustion engine 1 also includes an intake valve 6 and an exhaust valve 8 disposed in the cylinder head 4 and an electric variable valve timing mechanism (VVT) 61 that can change the timings to open and close the intake valve 6. The intake valve 6 opens and closes the intake port 7, and the exhaust valve 8 opens and closes the exhaust port 9.

The internal combustion engine 1 also includes an ignition plug 10 and a fuel injection valve 11. The ignition plug 10 is disposed at the center portion of the inner wall surface of the cylinder head 4, and generates a spark in accordance with an ignition signal. The fuel injection valve 11 is disposed at the peripheral portion of the inner wall surface of the cylinder head 4, and injects fuel into the combustion chamber 5 in accordance with an injection signal.

The internal combustion engine 1 also includes an intake manifold 13, a surge tank 14, an intake pipe 15, an air cleaner 16, and a throttle valve 18. The intake port 7 of each cylinder is coupled to the surge tank 14 via the corresponding intake manifold 13, and the surge tank 14 is coupled to the air cleaner 16 via the intake pipe 15. The intake port 7, the intake manifold 13, the surge tank 14, the intake pipe 15, etc. form an intake passage that guides air to the combustion chamber 5.

The throttle valve 18 is disposed in the intake pipe 15 between the surge tank 14 and the air cleaner 16, and driven by a throttle valve drive actuator 17 (e.g. a direct current (DC) motor). The throttle valve 18 is turned by the throttle valve drive actuator 17 to be able to change the opening area of the intake passage in accordance with the degree of opening of the throttle valve 18.

The internal combustion engine 1 also includes an exhaust manifold 19, a catalyst 20, a casing 21, and an exhaust pipe 22. The exhaust port 9 of each cylinder is coupled to the exhaust manifold 19. The exhaust manifold 19 has a plurality of branch portions coupled to each exhaust port 9 and a collection portion at which the branch portions are collected. The collection portion of the exhaust manifold 19 is coupled to the casing 21 that houses the catalyst 20. The casing 21 is coupled to the exhaust pipe 22. The exhaust port 9, the exhaust manifold 19, the casing 21, the exhaust pipe 22, etc. form an exhaust passage that discharges an exhaust gas generated through combustion of the air-fuel mixture in the combustion chamber 5.

While the internal combustion engine 1 discussed above is a non-supercharged internal combustion engine that uses gasoline as fuel, the configuration of the internal combustion engine 1 is not limited to the above configuration. Thus, the specific configuration of the internal combustion engine 1, such as cylinder arrangement, mode of fuel injection, configuration of intake and exhaust systems, configuration of a valve drive mechanism, and presence or absence of a supercharger, may be different from the configuration illustrated in FIG. 1. For example, the fuel injection valve 11 may be disposed so as to inject fuel into the intake port 7. There may be a component that recirculates an exhaust gas recirculation (EGR) gas from the exhaust passage to the intake passage. The internal combustion engine 1 may be a diesel engine.

Figure 3:
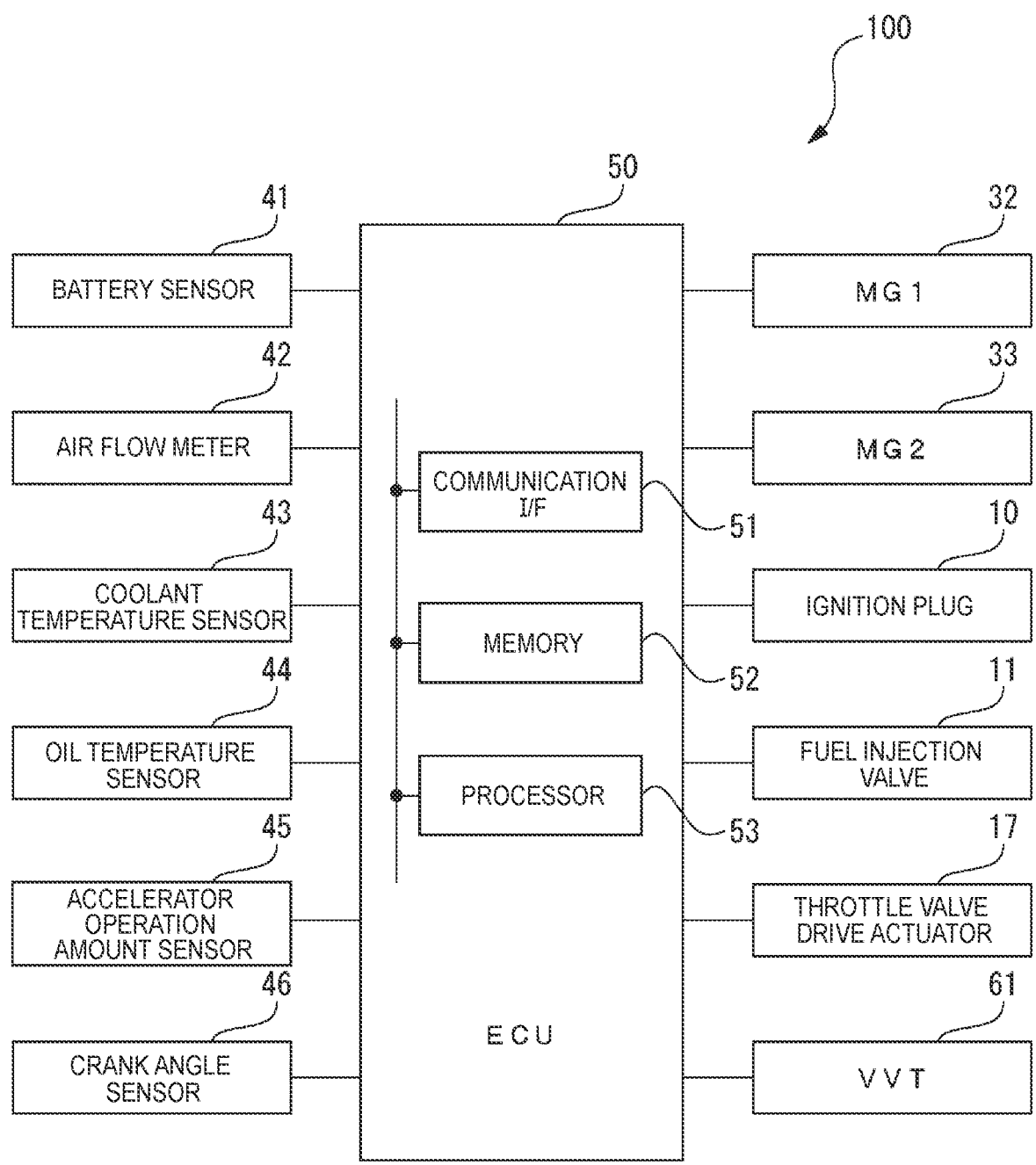
FIG. 3 is a block diagram illustrating a part of the configuration of the vehicle.

Next, a control device for the internal combustion engine will be described. FIG. 3 is a block diagram illustrating a part of the configuration of the vehicle 100. As illustrated in FIG. 3, the vehicle 100 includes an electronic control unit (ECU) 50. The ECU 50 includes a communication interface (communication I/F) 51, a memory 52, and a processor 53. The communication interface 51 and the memory 52 are connected to the processor 53 via a signal line. While a single ECU 50 is provided in the present embodiment, a plurality of ECUs may be provided for each function.

The communication interface 51 includes an interface circuit that connects the ECU 50 to an in-vehicle network that conforms to a standard such as a controller area network (CAN). The ECU 50 mutually communicates with in-vehicle devices connected to the in-vehicle network via the communication interface 51 and the in-vehicle network.

The memory 52 includes a volatile semiconductor memory (e.g. a random-access memory (RAM)) and a non-volatile semiconductor memory (e.g. a read only memory (ROM)), for example. The memory 52 stores a computer program to be executed by the processor 53, various data to be used when various processes are executed by the processor 53, etc. The computer program to be executed by the processor 53 may be provided in the form of being stored in a computer-readable storage medium. Examples of the computer-readable storage medium include a magnetic storage medium, an optical storage medium, and a semiconductor memory.

The processor 53 includes one or more central processing units (CPUs) and peripheral circuits, and executes various processes. The processor 53 may further include other computation circuits such as a logical operation unit, a numerical operation unit, and a graphical processing unit.

The ECU 50 executes various types of control on the internal combustion engine 1 based on outputs from various sensors provided in the vehicle 100 or the internal combustion engine 1 etc. The ECU 50 is an example of an internal combustion engine control device that controls the internal combustion engine 1. In the present embodiment, a battery sensor 41, an air flow meter 42, a coolant temperature sensor 43, an oil temperature sensor 44, an accelerator operation amount sensor 45, and a crank angle sensor 46 are electrically connected to the ECU 50, and outputs from such sensors are transmitted to the ECU 50.

As illustrated in FIG. 1, the battery sensor 41 is provided on the battery 35. The battery sensor 41 detects a state quantity of the battery 35. Examples of the battery sensor 41 include a voltage sensor that detects the voltage (cell voltage) of the battery 35, a temperature sensor that detects the temperature of the battery 35, a current sensor that detects the currents input to and output from the battery 35, etc.

As illustrated in FIG. 2, the air flow meter 42 is disposed in the intake passage of the internal combustion engine 1, specifically in the intake pipe 15 upstream of the throttle valve 18. The air flow meter 42 detects the flow rate of air that flows through the intake passage.

The coolant temperature sensor 43 is provided in a coolant path of the internal combustion engine 1, and detects the temperature of coolant of the internal combustion engine 1. The oil temperature sensor 44 is provided in an oil path of the internal combustion engine 1, and detects the temperature of lubricating oil that lubricates a sliding portion of the internal combustion engine 1.

The accelerator operation amount sensor 45 detects the amount (accelerator operation amount) of depression of an accelerator pedal provided in the vehicle 100. The ECU 50 calculates an engine load based on an output of the accelerator operation amount sensor 45.

The crank angle sensor 46 generates an output pulse each time the crankshaft of the internal combustion engine 1 is rotated by a predetermined angle (e.g. 10 degrees). The ECU 50 calculates an engine rotational speed based on an output of the crank angle sensor 46.

In the present embodiment, the first motor generator 32, the second motor generator 33, the ignition plug 10, the fuel injection valve 11, the throttle valve drive actuator 17, and the VVT 61 are electrically connected to the ECU 50, and the ECU 50 controls such components. For example, the ECU 50 controls output torque of the first motor generator 32 and the second motor generator 33 via the PCU 34. The ECU 50 also controls the ignition timing of the ignition plug 10, the injection timing and the injection amount of fuel to be injected from the fuel injection valve 11, the degree of opening of the throttle valve 18, and the valve opening timing and the valve closing timing of the intake valve 6.

Figure 4:
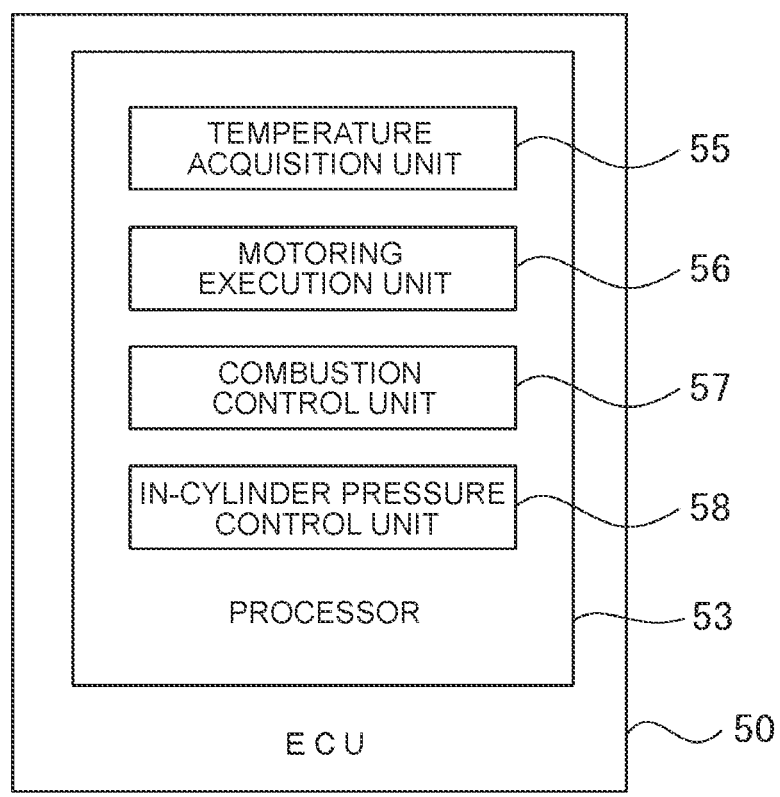
FIG. 4 is a functional block diagram of a processor of an electronic control unit (ECU) according to the first embodiment illustrated in FIG. 3.

FIG. 4 is a functional block diagram of the processor 53 of the ECU 50 according to the first embodiment. In the present embodiment, the processor 53 includes a temperature acquisition unit 55, a motoring execution unit 56, a combustion control unit 57, and an in-cylinder pressure control unit 58. The temperature acquisition unit 55, the motoring execution unit 56, the combustion control unit 57, and the in-cylinder pressure control unit 58 are functional modules implemented by the processor 53 of the ECU 50 executing the computer program stored in the memory 52 of the ECU 50. Such functional modules may each be implemented by a dedicated computation circuit provided in the processor 53.

The temperature acquisition unit 55 acquires the temperature of the internal combustion engine 1. For example, the temperature acquisition unit 55 acquires the temperature of the internal combustion engine 1 based on an output of at least one of the coolant temperature sensor 43 and the oil temperature sensor 44. In the present embodiment, in particular, the temperature acquisition unit 55 acquires the temperature (hereinafter also referred to as an "initial temperature of the internal combustion engine 1") of the internal combustion engine 1 at the time when it is requested to start the internal combustion engine 1.

The motoring execution unit 56 executes motoring of the internal combustion engine 1 using the first motor generator 32 when it is requested to start the internal combustion engine 1. Specifically, the motoring execution unit 56 raises the engine rotational speed by rotationally driving the crankshaft 40 of the internal combustion engine 1 using an output of the first motor generator 32 before combustion of the air-fuel mixture is started in the internal combustion engine 1. The first motor generator 32 is an example of a motor that is used for motoring.

The combustion control unit 57 controls combustion of the air-fuel mixture in the combustion chamber 5 by controlling the ignition plug 10, the fuel injection valve 11, etc. The combustion control unit 57 starts the internal combustion engine 1 by starting combustion of the air-fuel mixture when the engine rotational speed is raised to a predetermined starting rotational speed through motoring.

The in-cylinder pressure control unit 58 controls the in-cylinder pressure of the internal combustion engine 1. In the present embodiment, the in-cylinder pressure control unit 58 controls the in-cylinder pressure by changing the valve closing timing of the intake valve 6 using the VVT 61. The intake valve 6 is opened around the exhaust top dead center, and closed in the compression stroke from the intake bottom dead center to the compression top dead center. Therefore, when the valve closing timing of the intake valve 6 is advanced, the valve closing timing of the intake valve 6 approaches the intake bottom dead center, and the in-cylinder pressure is increased along with an increase in the intake air amount. When the valve closing timing of the intake valve 6 is retarded, on the other hand, the valve closing timing of the intake valve 6 approaches the compression top dead center, and the in-cylinder pressure is lowered along with a decrease in the intake air amount. Thus, the in-cylinder pressure control unit 58 advances the valve closing timing of the intake valve 6 to increase the in-cylinder pressure, and retards the valve closing timing of the intake valve 6 to decrease the in-cylinder pressure.

It has conventionally been considered to be effective to lower the in-cylinder pressure of the internal combustion engine 1 during motoring, irrespective of the temperature of the internal combustion engine 1, in order to promote a rise in the engine rotational speed due to motoring. On the contrary, the inventor of the present application has found that friction torque is increased and a mechanical loss due to friction is increased when the in-cylinder pressure during motoring is lowered when the internal combustion engine 1 is started at low temperatures, in consideration of the lubrication state of the sliding portion (such as the piston 3 and the crankshaft 40) of the internal combustion engine 1 at low temperatures.

Figure 5:
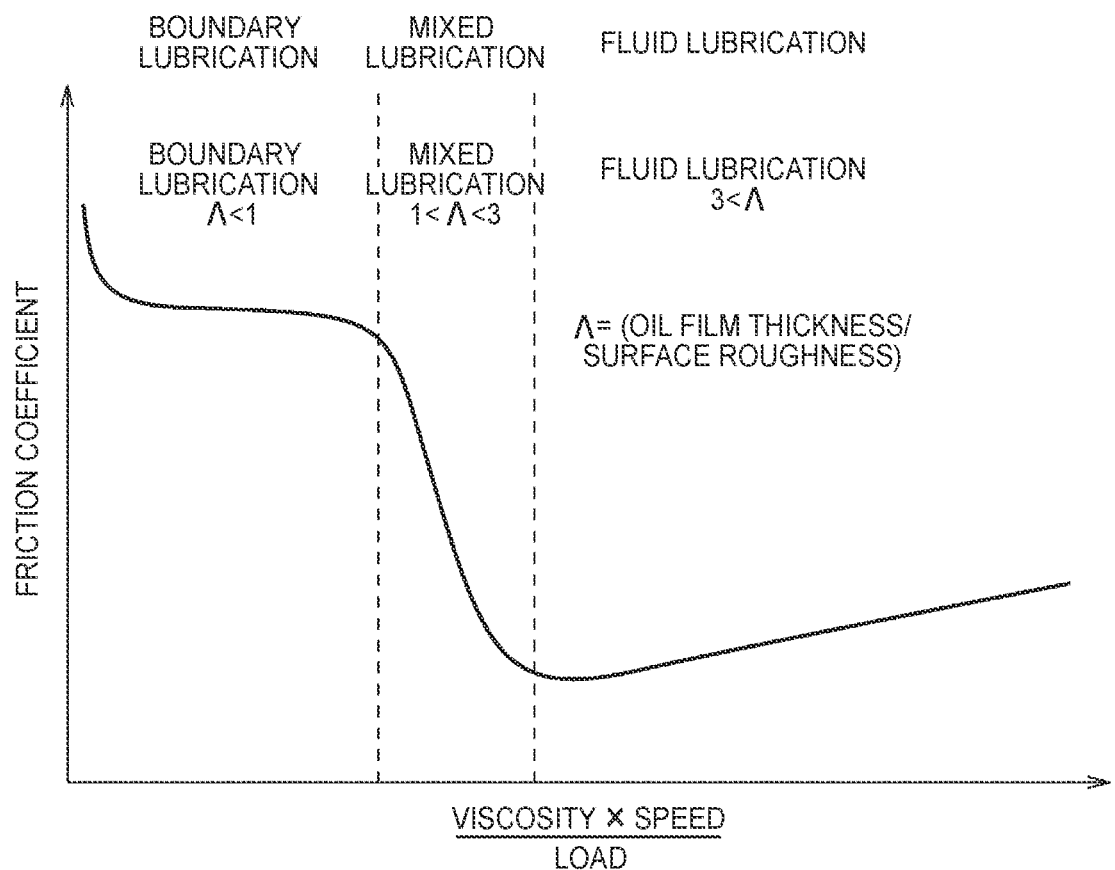
FIG. 5 is a Stribeck diagram illustrating three states of lubricated friction.

FIG. 5 is a Stribeck diagram illustrating three states of lubricated friction. When the lubrication state of the sliding portion of the internal combustion engine 1 is fluid lubrication, friction torque generated in the internal combustion engine 1 becomes larger as the engine rotational speed is lowered. When the lubrication state of the sliding portion of the internal combustion engine 1 is boundary lubrication or mixed lubrication, on the other hand, there is a region in which friction torque becomes larger when the engine rotational speed is lowered.

Figure 6:
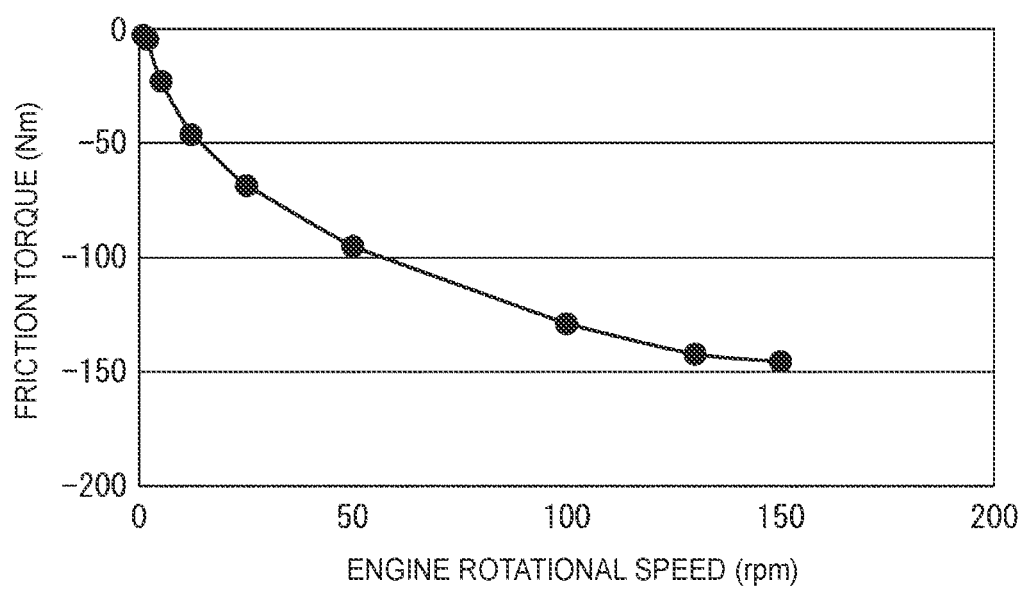
FIG. 6 illustrates the relationship between the engine rotational speed and friction torque with the internal combustion engine at an extremely low temperature.

FIG. 6 illustrates the relationship between the engine rotational speed and friction torque with the internal combustion engine 1 at an extremely low temperature. FIG. 6 indicates the result at the time when the temperature of the internal combustion engine 1 is −30° C., and indicates that friction torque is smaller as the absolute value of friction torque is smaller. As illustrated in FIG. 6, when the internal combustion engine 1 is at an extremely low temperature, friction torque becomes smaller as the engine rotational speed is lower. That is, it is assumed that the lubrication state of the sliding portion of the internal combustion engine 1 is fluid lubrication, irrespective of the value of the engine rotational speed, when the internal combustion engine 1 is at an extremely low temperature.

Therefore, when the internal combustion engine 1 is at an extremely low temperature, a mechanical loss due to friction can be reduced by lowering the engine rotational speed during motoring. In order to start combustion of the air-fuel mixture, however, it is necessary to raise the engine rotational speed to the starting rotational speed through motoring. Therefore, when the engine rotational speed is lowered by simply lowering output torque of the first motor generator 32, the time of motoring for starting the internal combustion engine 1 is extended, even if a mechanical loss can be reduced, and the startability of the internal combustion engine 1 is degraded.

Thus, in the present embodiment, the in-cylinder pressure control unit 58 controls the in-cylinder pressure of the internal combustion engine 1 during motoring based on the initial temperature of the internal combustion engine 1, in order to reduce motor torque that is necessary for motoring without degrading the startability of the internal combustion engine 1. Specifically, the in-cylinder pressure control unit 58 executes in-cylinder pressure increase control, in which the in-cylinder pressure is increased when the initial temperature of the internal combustion engine 1 is equal to or less than a predetermined threshold temperature compared to when the initial temperature of the internal combustion engine 1 is higher than the threshold temperature, since motoring is started.

In the present embodiment, the in-cylinder pressure control unit 58 increases the in-cylinder pressure by advancing the valve closing timing of the intake valve 6 in the in-cylinder pressure increase control. That is, the in-cylinder pressure control unit 58 advances the valve closing timing of the intake valve 6 when the initial temperature of the internal combustion engine 1 is equal to or less than the threshold temperature compared to when the initial temperature of the internal combustion engine 1 is higher than the threshold temperature.

Figure 7:
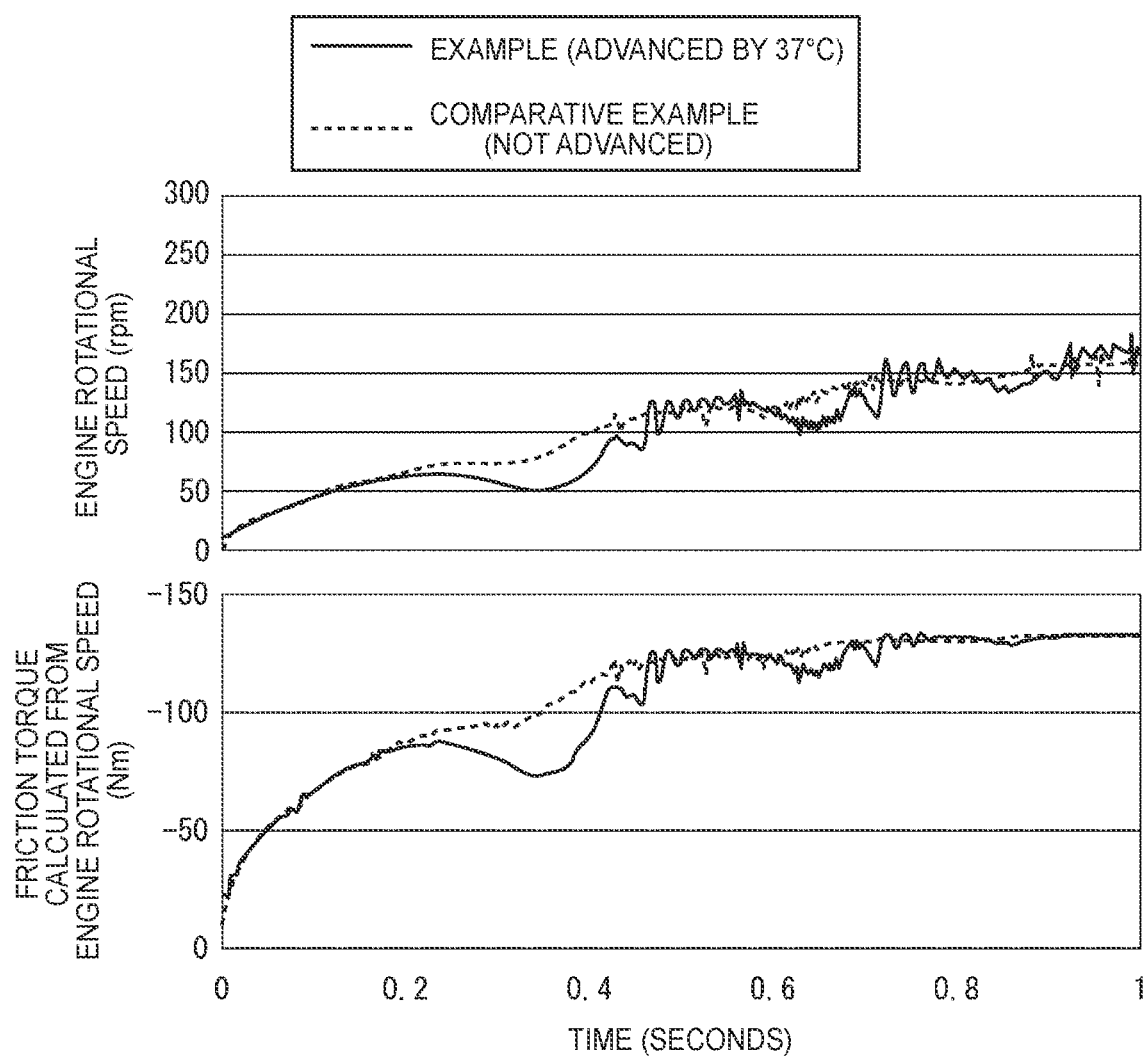
FIG. 7 illustrates time variations in the engine rotational speed and friction torque calculated from the engine rotational speed during motoring at the time when the internal combustion engine is started at low temperatures.

FIG. 7 illustrates time variations in the engine rotational speed and friction torque calculated from the engine rotational speed during motoring at the time when the internal combustion engine is started at low temperatures. In FIG. 7, the result with an example according to the present embodiment is indicated by solid lines, and the result with a comparative example is indicated by broken lines. The valve closing timing of the intake valve 6 during motoring is advanced by 37° in the example, and the valve closing timing of the intake valve 6 during motoring is not advanced in the comparative example.

When the in-cylinder pressure during motoring is increased by advancing the valve closing timing of the intake valve 6, the engine rotational speed is lowered in the compression stroke by a rise in the compression reaction force, but the speed of a rise in the engine rotational speed is increased in the expansion stroke by an increase in expansion energy. Therefore, in the example, as seen from FIG. 7, the engine rotational speed temporarily becomes lower than that in the comparative example in the intake stroke, but the speed of a rise in the engine rotational speed becomes higher than that in the comparative example in the subsequent expansion stroke. As a result, the time for the engine rotational speed to be raised to the starting rotational speed is equivalent between the example and the comparative example.

In a region in which the engine rotational speed in the example is lower than the engine rotational speed in the comparative example, on the other hand, friction torque in the example is lower than friction torque in the comparative example. That is, in the example, an average value of friction torque during motoring can be rendered smaller than that in the comparative example. Thus, with the present embodiment, it is possible to reduce motor torque that is necessary for motoring for driving the internal combustion engine 1, without degrading the startability of the internal combustion engine 1, when the internal combustion engine 1 is started at low temperatures.

As the temperature of the internal combustion engine 1 is lower, an output of the battery 35 is lowered, and output torque of the first motor generator 32 is also lowered. Therefore, in the present embodiment, the in-cylinder pressure control unit 58 increases the in-cylinder pressure in the in-cylinder pressure increase control to a greater degree as the initial temperature of the internal combustion engine 1 is lower when the initial temperature of the internal combustion engine 1 is equal to or less than the threshold temperature. That is, the in-cylinder pressure control unit 58 advances the valve closing timing of the intake valve 6 to a greater degree as the initial temperature of the internal combustion engine 1 is lower when the initial temperature of the internal combustion engine 1 is equal to or less than the threshold temperature. Consequently, motor torque that is necessary for motoring for driving the internal combustion engine 1 can be set to an appropriate value in accordance with the initial temperature of the internal combustion engine 1.

Figure 8:
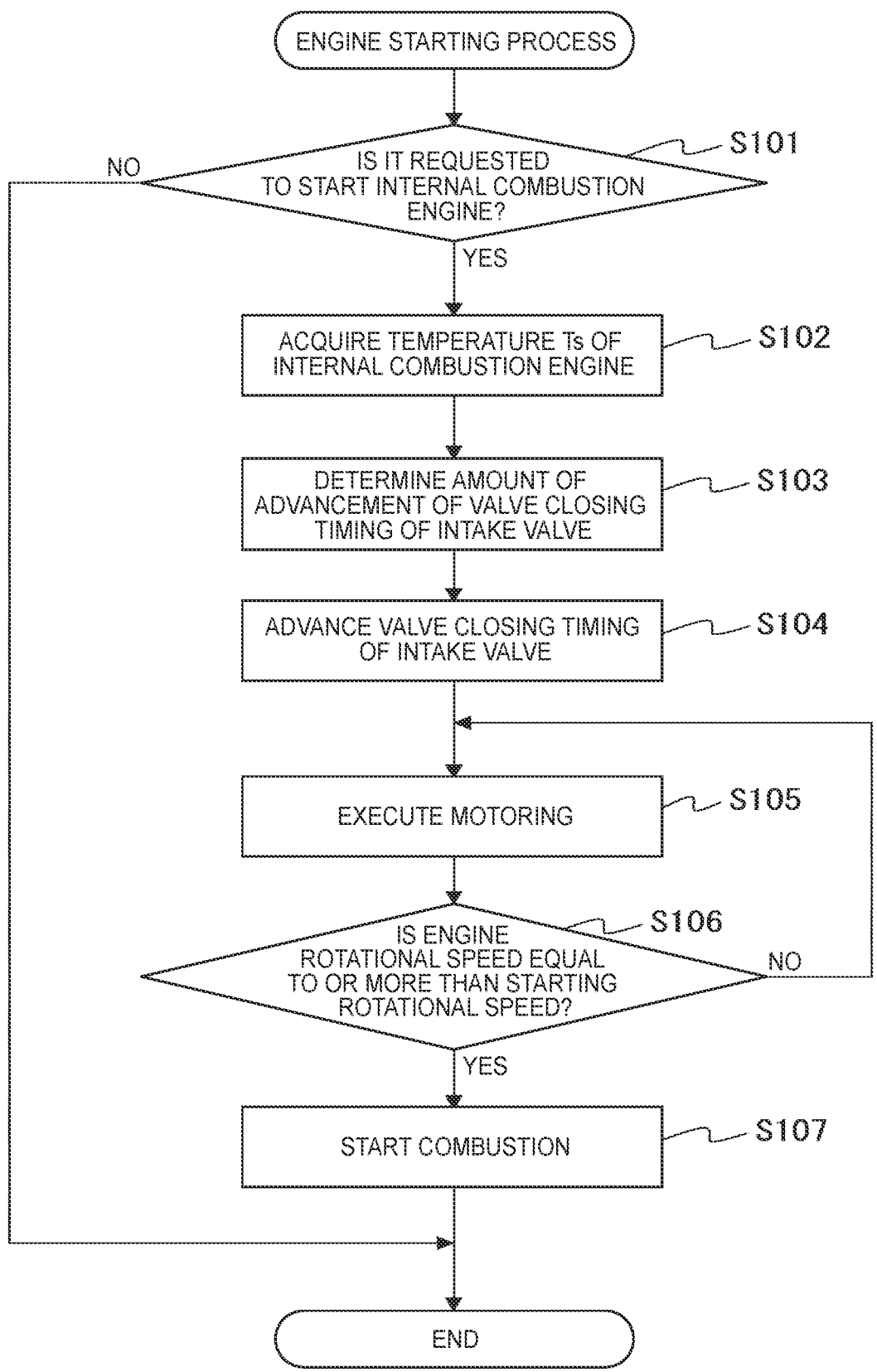
FIG. 8 is a flowchart illustrating a control routine of an internal combustion engine starting process according to the first embodiment.

Next, an internal combustion engine starting process will be described. The flow of the control discussed above will be described below with reference to FIG. 8. FIG. 8 is a flowchart illustrating a control routine of an internal combustion engine starting process according to the first embodiment. The present control routine is repeatedly executed by the processor 53 of the ECU 50.

First of all, in step S101, the motoring execution unit 56 determines whether it is requested to start the internal combustion engine 1. For example, it is requested to start the internal combustion engine 1 when the rate of charge (state of charge (SOC)) of the battery 35 has become equal to or less than a predetermined value or when a drive force required for the vehicle 100 has become equal to or more than a predetermined value. When it is determined that it is not requested to start the internal combustion engine 1, the present control routine is ended. When it is determined that it is requested to start the internal combustion engine 1, on the other hand, the present control routine proceeds to step S102.

In step S102, the temperature acquisition unit 55 acquires a temperature Ts of the internal combustion engine 1. For example, the temperature acquisition unit 55 acquires the lower one of the temperature of coolant detected by the coolant temperature sensor 43 and the temperature of lubricating oil detected by the oil temperature sensor 44 as the temperature Ts of the internal combustion engine 1. The temperature acquisition unit 55 may acquire an average value of the temperature of coolant and the temperature of lubricating oil as the temperature Ts of the internal combustion engine 1. Alternatively, the oil temperature sensor 44 may be omitted, and the temperature acquisition unit 55 may acquire the temperature of coolant as the temperature Ts of the internal combustion engine 1. Alternatively, the coolant temperature sensor 43 may be omitted, and the temperature acquisition unit 55 may acquire the temperature of lubricating oil as the temperature Ts of the internal combustion engine 1.

Figure 9:
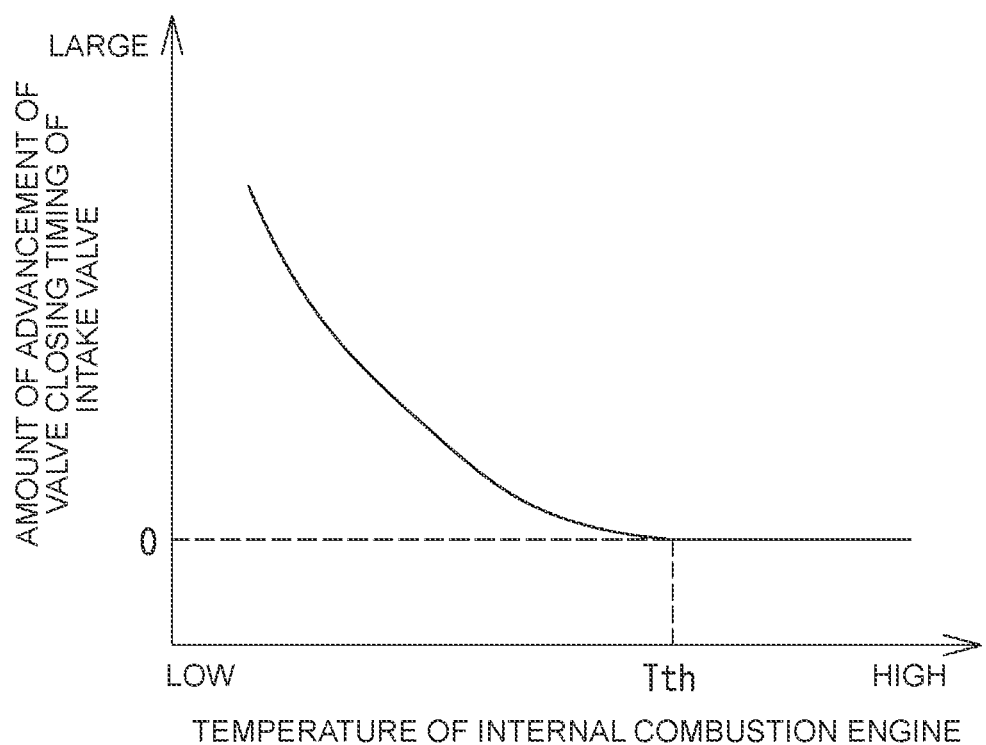
FIG. 9 illustrates an example of a map that indicates the relationship between the temperature of the internal combustion engine and the amount of advancement of the valve closing timing of an intake valve.

Then, in step S103, the in-cylinder pressure control unit 58 determines an amount of advancement of the valve closing timing of the intake valve 6 based on the temperature Ts of the internal combustion engine 1 acquired by the temperature acquisition unit 55 using a map or a calculation formula. FIG. 9 illustrates an example of a map that indicates the relationship between the temperature of the internal combustion engine 1 and the amount of advancement of the valve closing timing of the intake valve 6. As indicated in FIG. 9, the amount of advancement is set to zero when the temperature of the internal combustion engine 1 is higher than a threshold Tth. When the temperature of the internal combustion engine 1 is equal to or less than the threshold Tth, on the other hand, the amount of advancement is increased as the temperature of the internal combustion engine 1 is lower. The threshold temperature Tth has been determined in advance such that the lubrication state of the sliding portion of the internal combustion engine 1 is fluid lubrication in an extremely low temperature region that is lower than the threshold temperature Tth, and is set to −5° C. to −30° C., for example.

Then, in step S104, the in-cylinder pressure control unit 58 advances the valve closing timing of the intake valve 6 by controlling the VVT 61 so as to achieve the amount of advancement determined in step S103. For example, the in-cylinder pressure control unit 58 advances the valve closing timing of the intake valve 6 by advancing the center phase of the actuation angle of the intake valve 6 using the VVT 61.

Then, in step S105, the motoring execution unit 56 executes motoring of the internal combustion engine 1. Specifically, the motoring execution unit 56 raises the engine rotational speed by rotationally driving the crankshaft 40 of the internal combustion engine 1 using an output of the first motor generator 32.

Then, in step S106, the motoring execution unit 56 determines whether the engine rotational speed is equal to or more than a predetermined starting rotational speed. The engine rotational speed is calculated based on an output of the crank angle sensor 46. The starting rotational speed has been determined in advance in accordance with the properties of the internal combustion engine 1 as an engine rotational speed that is necessary for initial explosion, and is set to 150 rpm to 400 rpm, for example.

When it is determined in step S106 that the engine rotational speed is less than the starting rotational speed, the present control routine returns to step S105, and motoring is continued. When it is determined in step S106 that the engine rotational speed is equal to or more than the starting rotational speed, on the other hand, the present control routine proceeds to step S107.

In step S107, the combustion control unit 57 starts combustion of the air-fuel mixture. At this time, when the valve closing timing of the intake valve 6 during motoring has been advanced, that is, when the temperature Ts of the internal combustion engine 1 is equal to or less than the threshold temperature Tth, the in-cylinder pressure control unit 58 retards the valve closing timing of the intake valve 6 to a predetermined target value by controlling the VVT 61. The present control routine is ended after step S107.

Next, a second embodiment of the present disclosure will be described. An internal combustion engine control device according to the second embodiment is basically the same in configuration and control as the internal combustion engine control device according to the first embodiment except for the following respects. Therefore, the second embodiment of the present disclosure will be described below with focus on the differences from the first embodiment.

Figure 10:
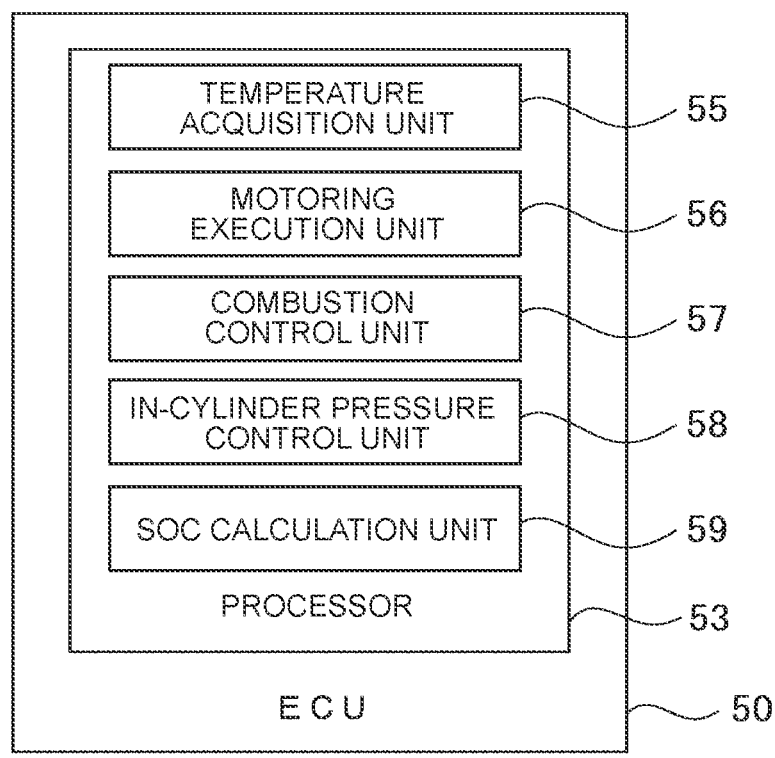
FIG. 10 is a functional block diagram of a processor of an ECU according to a second embodiment of the present disclosure.

FIG. 10 is a functional block diagram of the processor 53 of the ECU 50 according to the second embodiment. In the present embodiment, the processor 53 includes an SOC calculation unit 59 in addition to the temperature acquisition unit 55, the motoring execution unit 56, the combustion control unit 57, and the in-cylinder pressure control unit 58. The temperature acquisition unit 55, the motoring execution unit 56, the combustion control unit 57, the in-cylinder pressure control unit 58, and the SOC calculation unit 59 are functional modules implemented by the processor 53 of the ECU 50 executing the computer program stored in the memory 52 of the ECU 50. Such functional modules may each be implemented by a dedicated computation circuit provided in the processor 53.

The SOC calculation unit 59 calculates an SOC of the battery 35. When the SOC of the battery 35 is low, an output of the battery 35 is lowered because of a reduction in the voltage of the battery 35. As the SOC of the battery 35 is lower, an output of the battery 35 is lowered, and output torque of the first motor generator 32 is also lowered. Thus, in the second embodiment, the in-cylinder pressure control unit 58 increases the in-cylinder pressure in the in-cylinder pressure increase control to a greater degree as the SOC of the battery 35 is lower when the initial temperature of the internal combustion engine 1 is equal to or less than the threshold temperature. That is, the in-cylinder pressure control unit 58 advances the valve closing timing of the intake valve 6 in the in-cylinder pressure increase control to a greater degree as the SOC of the battery 35 is lower when the initial temperature of the internal combustion engine 1 is equal to or less than the threshold temperature. Consequently, motor torque that is necessary for motoring for driving the internal combustion engine 1 can be set to an appropriate value in accordance with the SOC of the battery 35.

Figure 11:
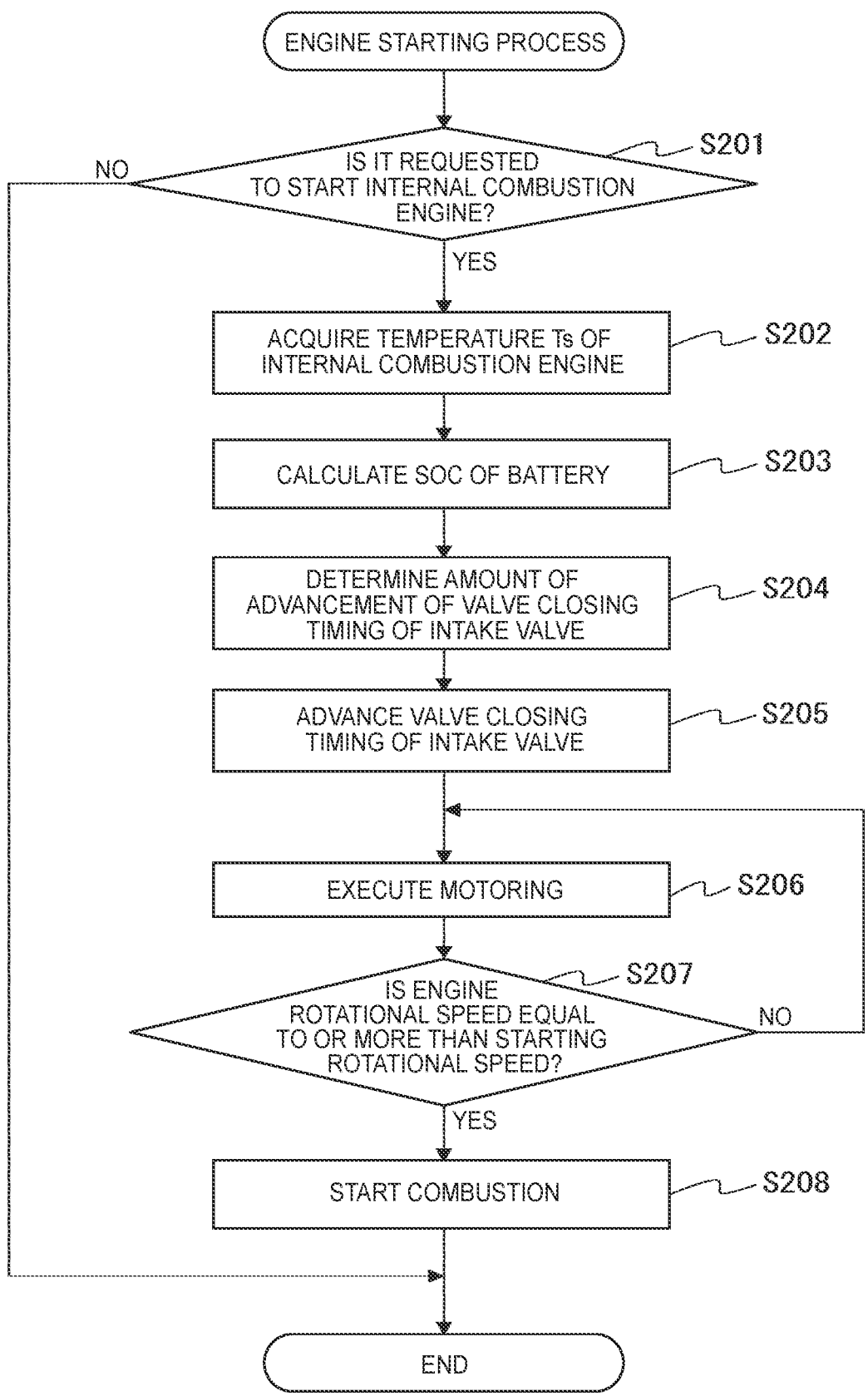
FIG. 11 is a flowchart illustrating a control routine of an internal combustion engine starting process according to the second embodiment.

FIG. 11 is a flowchart illustrating a control routine of an internal combustion engine starting process according to the second embodiment. The present control routine is repeatedly executed by the processor 53 of the ECU 50.

First of all, in step S201, as in step S101 in FIG. 8, the motoring execution unit 56 determines whether it is requested to start the internal combustion engine 1. When it is determined that it is not requested to start the internal combustion engine 1, the present control routine is ended. When it is determined that it is requested to start the internal combustion engine 1, on the other hand, the present control routine proceeds to step S202.

In step S202, as in step S102 in FIG. 8, the temperature acquisition unit 55 acquires a temperature Ts of the internal combustion engine 1.

Then, in step S203, the SOC calculation unit 59 calculates an SOC of the battery 35 based on an output of the battery sensor 41. For example, the SOC calculation unit 59 calculates an SOC of the battery 35 based on the voltage and the temperature of the battery 35 detected by the battery sensor 41, since the voltage of the battery 35 is correlated with the SOC and the temperature of the battery 35. The SOC calculation unit 59 may calculate an SOC of the battery 35 by integrating the currents input to and output from the battery 35 detected by the battery sensor 41. Alternatively, the SOC calculation unit 59 may calculate an SOC of the battery 35 using a state estimation method such as a Kalman filter.

Figure 12:
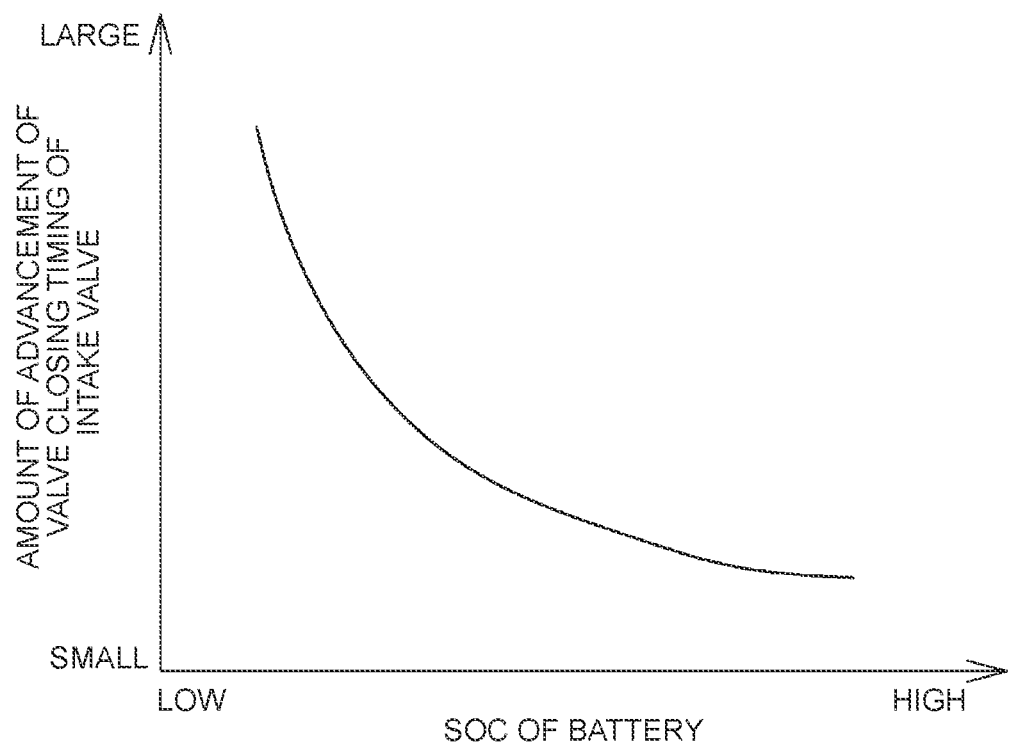
FIG. 12 illustrates an example of a map that indicates the relationship between a state of charge (SOC) of a battery mounted on the vehicle and the amount of advancement of the valve closing timing of the intake valve of the internal combustion engine.

Then, in step S204, the in-cylinder pressure control unit 58 determines an amount of advancement of the valve closing timing of the intake valve 6 based on the temperature Ts of the internal combustion engine 1 acquired by the temperature acquisition unit 55 and the SOC of the battery 35 calculated by the SOC calculation unit 59 using a map or a calculation formula. For example, the in-cylinder pressure control unit 58 determines an amount of advancement of the valve closing timing of the intake valve 6 based on the SOC of the battery 35 using a map such as that illustrated in FIG. 12 when the temperature Ts of the internal combustion engine 1 is equal to or less than the threshold temperature Tth. FIG. 12 illustrates an example of a map that indicates the relationship between the SOC of the battery 35 and the amount of advancement of the valve closing timing of the intake valve 6. As indicated in FIG. 12, the valve closing timing is advanced to a greater degree as the SOC of the battery 35 is lower.

Figure 13:
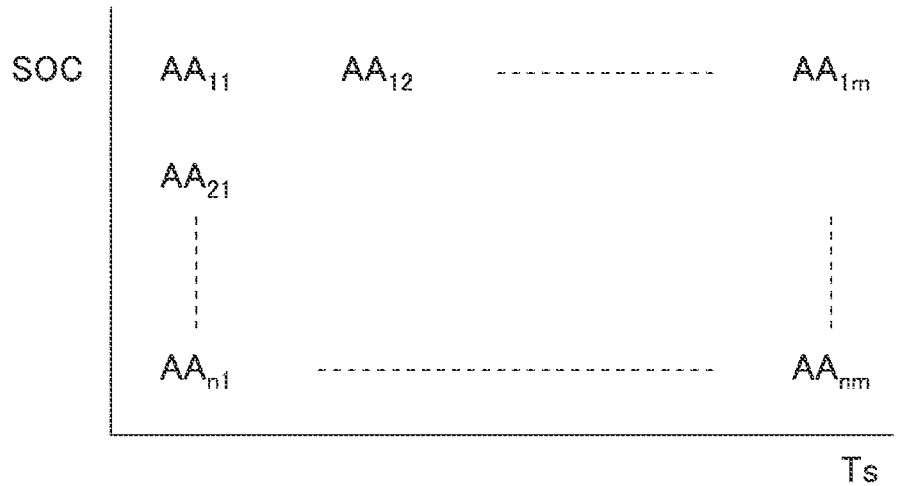
FIG. 13 illustrates a two-dimensional map for determining the amount of advancement of the valve closing timing of the intake valve based on the temperature of the internal combustion engine and the SOC of the battery.

The in-cylinder pressure control unit 58 may determine an amount of advancement AA of the valve closing timing of the intake valve 6 based on the temperature Ts of the internal combustion engine 1 and the SOC of the battery 35 using a two-dimensional map such as that illustrated in FIG. 13. This map is prepared such that the amount of advancement AA becomes larger as the temperature Ts of the internal combustion engine 1 is lower and the amount of advancement AA becomes larger as the SOC of the battery 35 is lower.

After that, steps S205 to S208 are executed in the same manner as steps S104 to S107, respectively, in FIG. 8.

Next, a third embodiment of the present disclosure will be described. An internal combustion engine control device according to the third embodiment is basically the same in configuration and control as the internal combustion engine control device according to the first embodiment except for the following respects. Therefore, the third embodiment of the present disclosure will be described below with focus on the differences from the first embodiment.

In the third embodiment, the VVT 61 is configured to be driven hydraulically. That is, the VVT 61 is a hydraulic variable valve timing mechanism. When the VVT 61 is a hydraulic variable valve timing mechanism, it takes more time for the VVT 61 to perform advancement control than when the VVT 61 is an electric variable valve timing mechanism. Therefore, the effect of reducing friction torque may be lowered since motoring is started until advancement of the valve closing timing of the intake valve 6 is completed. When the temperature of the internal combustion engine 1 at the time of startup is low, there is a high possibility that the temperature of the internal combustion engine 1 is low also at the time of next startup.

Therefore, in the third embodiment, when the initial temperature of the internal combustion engine 1 is equal to or less than a predetermined threshold temperature, the in-cylinder pressure control unit 58 advances the valve closing timing of the intake valve 6 when the internal combustion engine 1 is stopped. Consequently, even when the VVT 61 is a hydraulic variable valve timing mechanism, an amount of advancement that is suitable for the starting state of the internal combustion engine 1 can be achieved when motoring is started when the internal combustion engine 1 is started next time.

For example, when the initial temperature of the internal combustion engine 1 is equal to or less than the threshold temperature, the in-cylinder pressure control unit 58 advances the valve closing timing of the intake valve 6 at the time when the internal combustion engine 1 is stopped to a greater degree as the initial temperature of the internal combustion engine is lower. Consequently, the amount of advancement can be set to an appropriate value, and the effect of reducing friction torque at the time of next startup can be enhanced.

Figure 14:
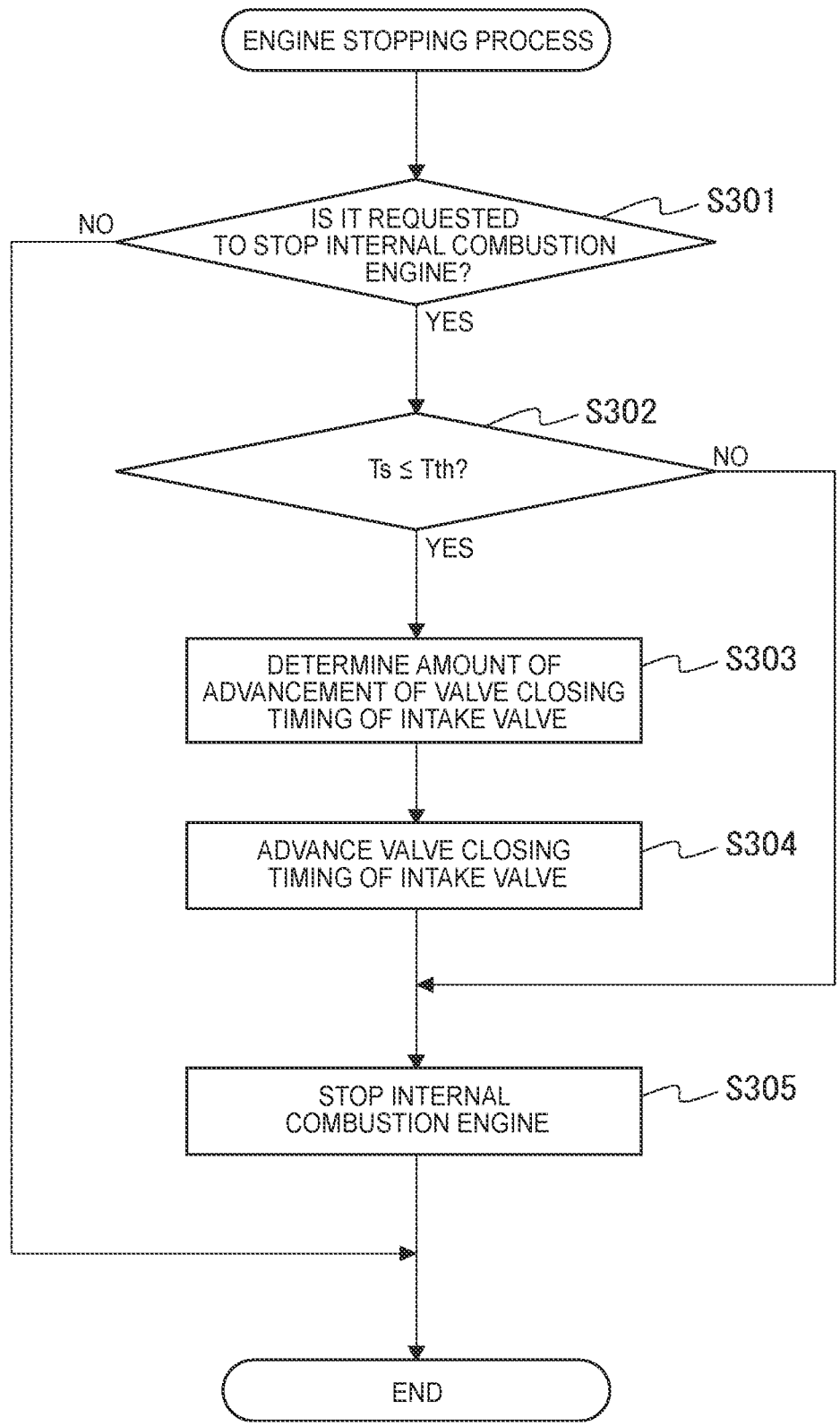
FIG. 14 is a flowchart illustrating a control routine of an engine stopping process according to a third embodiment of the present disclosure.

In the third embodiment, a control routine of an engine stopping process in FIG. 14 is executed in addition to the control routine of the internal combustion engine starting process in FIG. 8. FIG. 14 is a flowchart illustrating a control routine of an engine stopping process according to the third embodiment. The present control routine is repeatedly executed by the processor 53 of the ECU 50.

First of all, in step S301, the combustion control unit 57 determines whether it is requested to stop the internal combustion engine 1. When it is determined that it is not requested to stop the internal combustion engine 1, the present control routine is ended. When it is determined that it is requested to stop the internal combustion engine 1, on the other hand, the present control routine proceeds to step S302.

In step S302, the in-cylinder pressure control unit 58 determines whether the temperature Ts of the internal combustion engine 1 acquired in step S102 in FIG. 8, that is, the initial temperature of the internal combustion engine, is equal to or less than the predetermined threshold temperature Tth. The threshold temperature Tth has been determined in advance such that the lubrication state of the sliding portion of the internal combustion engine 1 is fluid lubrication in an extremely low temperature region that is lower than the threshold temperature Tth, and is set to −5° C. to −30° C., for example.

When it is determined in S302 that the temperature Ts of the internal combustion engine 1 is equal to or less than the threshold temperature Tth, the present control routine proceeds to step S303. In step S303, the in-cylinder pressure control unit 58 determines an amount of advancement of the valve closing timing of the intake valve 6 based on the temperature Ts of the internal combustion engine 1 using a map or a calculation formula. For example, the in-cylinder pressure control unit 58 determines an amount of advancement of the valve closing timing of the intake valve 6 using a map such as that illustrated in FIG. 9. In this case, the in-cylinder pressure control unit 58 sets the amount of advancement at the time when the internal combustion engine 1 is to be stopped to a value that is equal to the amount of advancement set during motoring.

Then, in step S304, the in-cylinder pressure control unit 58 advances the valve closing timing of the intake valve 6 by controlling the VVT 61 so as to achieve the amount of advancement determined in step S303. For example, the in-cylinder pressure control unit 58 advances the valve closing timing of the intake valve 6 by advancing the center phase of the actuation angle of the intake valve 6 using the VVT 61.

After step S304, the present control routine proceeds to step S305. When it is determined in step S302 that the temperature Ts of the internal combustion engine 1 is higher than the threshold temperature Tth, on the other hand, the present control routine proceeds to step S305 by skipping steps S303 and S304. In step S305, the combustion control unit 57 stops the internal combustion engine 1 by stopping combustion of the air-fuel mixture. After step S305, the present control routine is ended.

Next, other embodiments of the present disclosure will be described. While embodiments of the present disclosure have been described above, the present disclosure is not limited to such embodiments, and various modifications and changes may be made within the scope of the claims. For example, the in-cylinder pressure control unit 58 may increase the in-cylinder pressure in the in-cylinder pressure increase control to a constant degree, irrespective of the temperature of the internal combustion engine 1, when the initial temperature of the internal combustion engine 1 is equal to or less than the threshold temperature. That is, the in-cylinder pressure control unit 58 may advance the valve closing timing of the intake valve 6 in the in-cylinder pressure increase control to a constant degree, irrespective of the temperature of the internal combustion engine 1, when the initial temperature of the internal combustion engine 1 is equal to or less than the threshold temperature.

The internal combustion engine 1 may include a known variable valve lift mechanism, and the in-cylinder pressure control unit 58 may control the in-cylinder pressure by changing the amount of lift of the intake valve 6 using the variable valve lift mechanism. In this case, the in-cylinder pressure control unit 58 increases the amount of lift to increase the in-cylinder pressure, and reduces the amount of lift to decrease the in-cylinder pressure.

The internal combustion engine 1 may include a known variable compression ratio mechanism, and the in-cylinder pressure control unit 58 may control the in-cylinder pressure by changing the mechanical compression ratio of the internal combustion engine 1 using the variable compression ratio mechanism. In this case, the in-cylinder pressure control unit 58 increases the mechanical compression ratio to increase the in-cylinder pressure, and lowers the mechanical compression ratio to decrease the in-cylinder pressure. Examples of the known variable compression ratio mechanism include a multilink variable compression ratio mechanism and a variable-length connecting rod.

The in-cylinder pressure control unit 58 may control the in-cylinder pressure by changing the degree of opening of the throttle valve 18 using the throttle valve drive actuator 17. In this case, the in-cylinder pressure control unit 58 increases the degree of opening of the throttle valve 18 to increase the in-cylinder pressure, and reduces the degree of opening of the throttle valve 18 to decrease the in-cylinder pressure.

The internal combustion engine control device may be applied to vehicles such as series hybrid electric vehicles in which only an electric motor is used as a power source for travel and plug-in hybrid electric vehicles (PHEVs) with a battery that can be charged from an external power source. The internal combustion engine control device may be applied to vehicles that include only an internal combustion engine as a power source for travel if the vehicles include a motor for motoring. In this case, it is requested to start the internal combustion engine when an ignition switch of the vehicle is turned on. The embodiments discussed above can be implemented in any combination.

For example, when the second embodiment is combined with the third embodiment, the control routine in FIG. 11 is executed in place of the control routine in FIG. 8 as the control routine of the internal combustion engine starting process.

What is claimed is:

1. An internal combustion engine control device configured to control an internal combustion engine mounted on a vehicle that includes a motor and a battery, the internal combustion engine control device comprising:
   a temperature acquisition unit configured to acquire a temperature of the internal combustion engine at a time when it is requested to start the internal combustion engine;
   a motoring execution unit configured to execute motoring of the internal combustion engine using the motor when it is requested to start the internal combustion engine;
   a state of charge (SOC) calculation unit configured to calculate an SOC of the battery; and
   an in-cylinder pressure control unit configured to;
      control an in-cylinder pressure of the internal combustion engine during the motoring based on the temperature of the internal combustion engine,
      execute in-cylinder pressure increase control, in which the in-cylinder pressure is increased when the temperature of the internal combustion engine is equal to or less than a threshold temperature compared to when the temperature of the internal combustion engine is higher than the threshold temperature, since the motoring is started, and
      increase the in-cylinder pressure in the in-cylinder pressure increase control to a greater degree as the SOC is lower when the temperature of the internal combustion engine is equal to or less than the threshold temperature.

2. The internal combustion engine control device according to claim 1, wherein the in-cylinder pressure control unit is configured to increase the in-cylinder pressure in the in-cylinder pressure increase control to a greater degree as the temperature of the internal combustion engine is lower when the temperature of the internal combustion engine is equal to or less than the threshold temperature.

3. The internal combustion engine control device according to claim 1, wherein the in-cylinder pressure control unit is configured to increase the in-cylinder pressure in the in-cylinder pressure increase control to a constant degree, irrespective of the temperature of the internal combustion engine, when the temperature of the internal combustion engine is equal to or less than the threshold temperature.

4. The internal combustion engine control device according to claim 1, wherein the in-cylinder pressure control unit is configured to control the in-cylinder pressure by changing a valve closing timing of an intake valve of the internal combustion engine using a variable valve timing mechanism provided in the internal combustion engine.

5. The internal combustion engine control device according to claim 4, wherein the variable valve timing mechanism is an electric variable valve timing mechanism to be driven electrically.

6. The internal combustion engine control device according to claim 4, wherein:
   the variable valve timing mechanism is a hydraulic variable valve timing mechanism to be driven hydraulically; and the in-cylinder pressure control unit is configured to advance the valve closing timing when the internal combustion engine is stopped when the temperature of the internal combustion engine is equal to or less than the threshold temperature.

7. The internal combustion engine control device according to claim 6, wherein the in-cylinder pressure control unit is configured to advance the valve closing timing at a time when the internal combustion engine is stopped to a greater degree as the temperature of the internal combustion engine is lower when the temperature of the internal combustion engine is equal to or less than the threshold temperature.

8. The internal combustion engine control device according to claim 6, wherein the in-cylinder pressure control unit is configured to advance the valve closing timing to a constant degree, irrespective of the temperature of the internal combustion engine, when the temperature of the internal combustion engine is equal to or less than the threshold temperature.

9. The internal combustion engine control device according to claim 1, wherein the in-cylinder pressure control unit is configured to control the in-cylinder pressure by changing an amount of lift of an intake valve of the internal combustion engine using a variable valve lift mechanism provided in the internal combustion engine.

10. The internal combustion engine control device according to claim 1, wherein the in-cylinder pressure control unit is configured to control the in-cylinder pressure by changing a mechanical compression ratio of the internal combustion engine using a variable compression ratio mechanism provided in the internal combustion engine.

11. An internal combustion engine control method of controlling an internal combustion engine mounted on a vehicle that includes a motor and a battery, the internal combustion engine control method comprising:
acquiring a temperature of the internal combustion engine at a time when it is requested to start the internal combustion engine;
executing motoring of the internal combustion engine using the motor when it is requested to start the internal combustion engine;
calculating a state of charge (SOC) of the battery;
controlling an in-cylinder pressure of the internal combustion engine during the motoring based on the temperature of the internal combustion engine;
executing in-cylinder pressure increase control, in which the in-cylinder pressure is increased when the temperature of the internal combustion engine is equal to or less than a threshold temperature compared to when the temperature of the internal combustion engine is higher than the threshold temperature, since the motoring is started; and
increasing the in-cylinder pressure in the in-cylinder pressure increase control to a greater degree as the SOC is lower when the temperature of the internal combustion engine is equal to or less than the threshold temperature.

\* \* \* \* \*